(12) United States Patent
Kubo

(10) Patent No.: US 6,631,427 B2
(45) Date of Patent: *Oct. 7, 2003

(54) DATA RECORDING APPARATUS AND METHOD INCLUDING CONTROL DATA INVALIDATING FUNCTION

(75) Inventor: Ryoji Kubo, Funabashi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/898,044

(22) Filed: Jul. 18, 1997

(65) Prior Publication Data

US 2001/0042168 A1 Nov. 15, 2001

(30) Foreign Application Priority Data

Jul. 19, 1996 (JP) .............................. 8-190807

(51) Int. Cl.[7] ................................ G06F 11/30
(52) U.S. Cl. .............................. 710/17; 710/13; 711/2; 711/5; 711/115; 714/42; 714/44; 714/8; 714/22; 365/229
(58) Field of Search ........................... 711/1, 2, 5, 115, 711/170, 171, 172, 173, 201; 710/8, 10, 13, 17, 301, 302, 303, 304, 15, 18, 19; 713/1, 200, 321, 340; 365/229; 714/22, 3, 42, 44

(56) References Cited

U.S. PATENT DOCUMENTS

| 4,380,047 A | * | 4/1983 | Eisenhard et al. | 386/125 |
|---|---|---|---|---|
| 4,712,196 A | * | 12/1987 | Uesugi | 365/229 |
| 5,235,532 A | * | 8/1993 | Sugino | 713/321 |
| 5,257,388 A | * | 10/1993 | Hayamizu | 711/115 |
| 5,488,708 A | * | 1/1996 | Hayashi | 711/115 |
| 5,568,611 A | * | 10/1996 | Khatri et al. | 713/200 |
| 5,721,830 A | * | 2/1998 | Yeh et al. | 709/237 |
| 5,832,200 A | * | 11/1998 | Yoda | 710/102 |
| 5,938,764 A | * | 8/1999 | Klein | 713/1 |

* cited by examiner

Primary Examiner—B. James Peikari
(74) Attorney, Agent, or Firm—Fitzpatrick, Cella, Harper & Scinto

(57) ABSTRACT

When a device is removed during recording, there is a possibility such that a fatal error may be caused in the device. Information for device control is read out from the device. When it is detected that a cover which covers the device is opened or that a power voltage is equal to or less than a predetermined value during the operation with a battery, a control unit invalidates the read-out control information for the device. Therefore, when the device is erroneously taken out during the recording or when a battery output drops during the recording, a fatal error is not caused in the device.

8 Claims, 7 Drawing Sheets

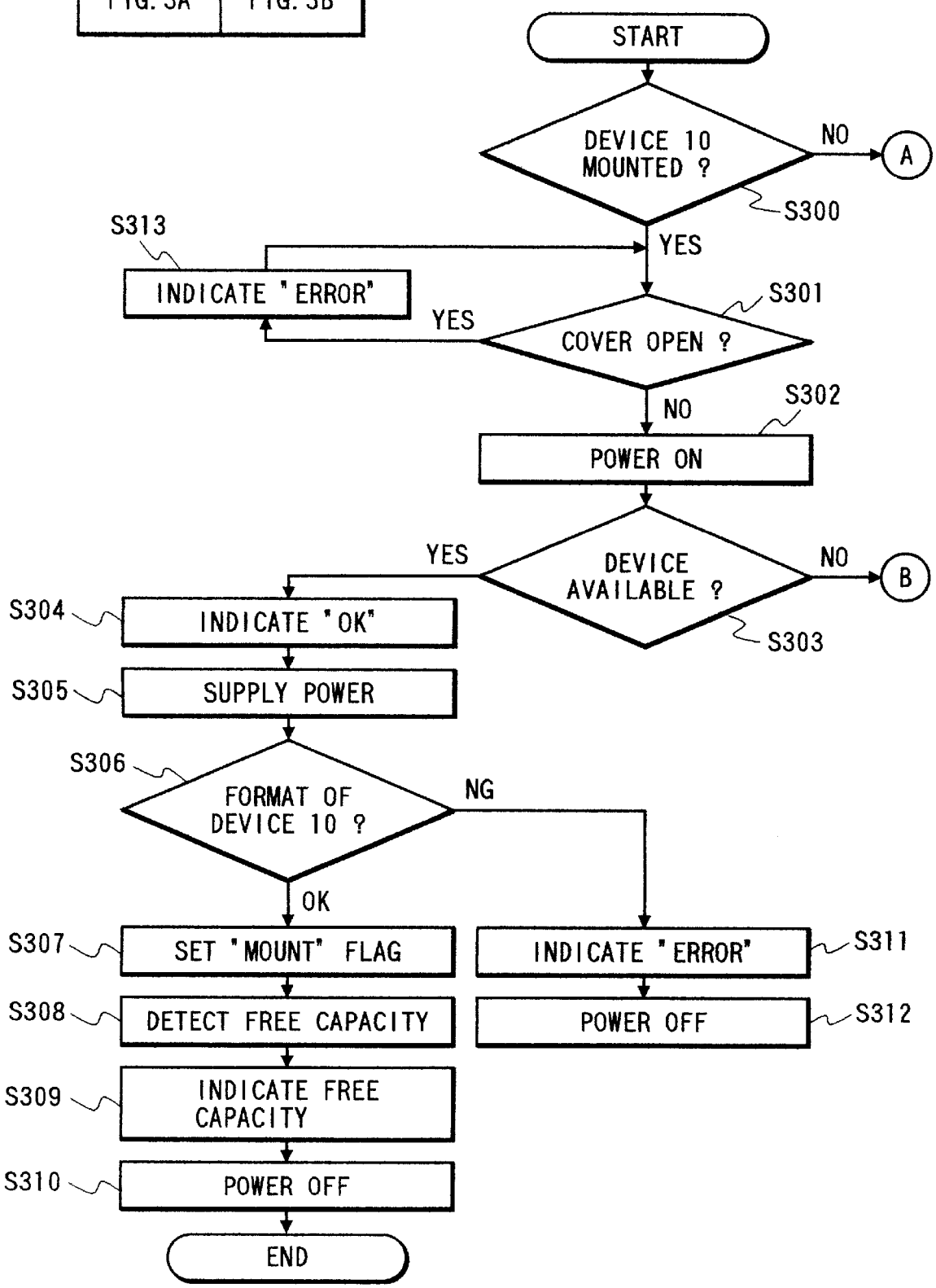

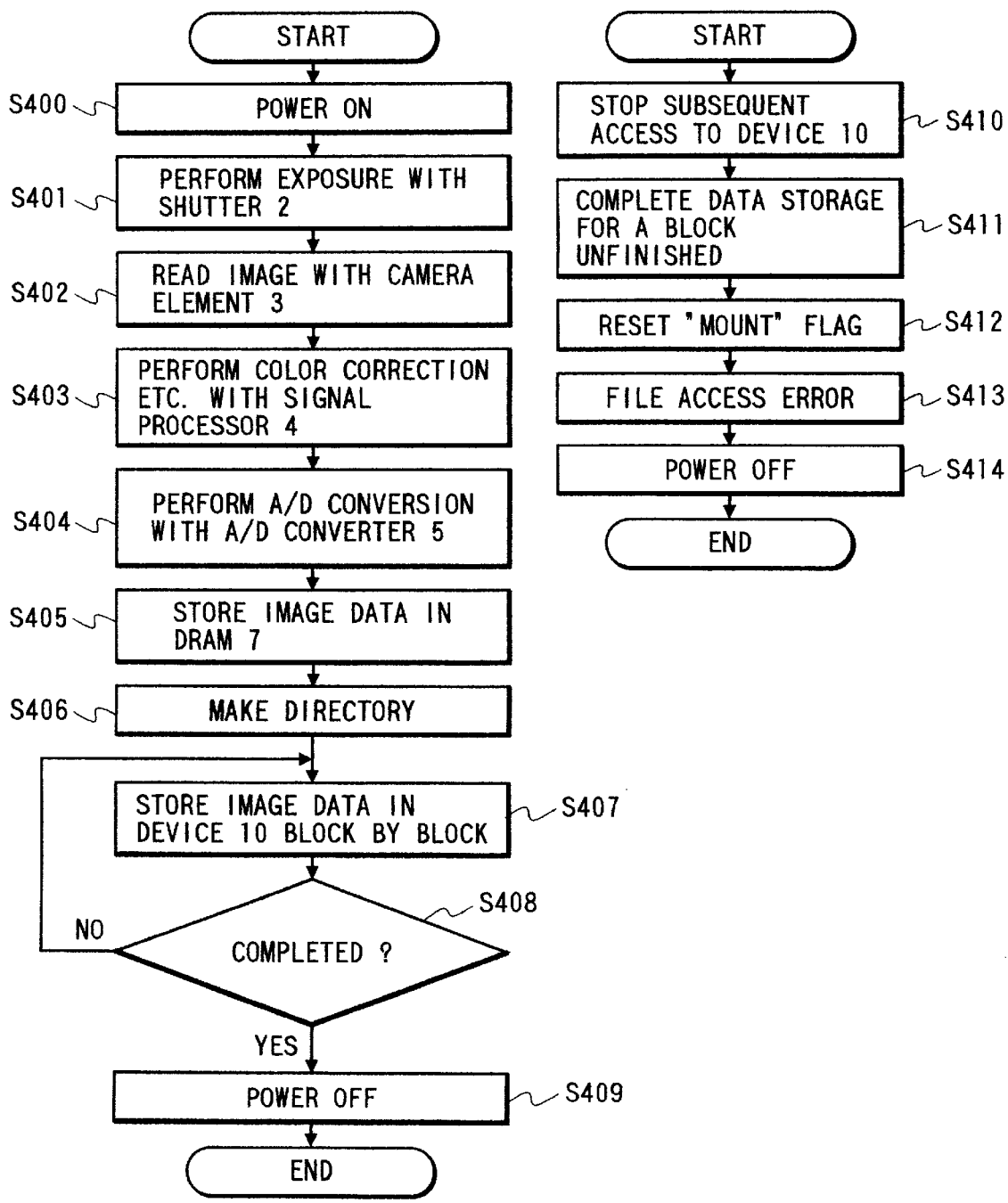

DATA RECORDING APPARATUS AND METHOD INCLUDING CONTROL DATA INVALIDATING FUNCTION

BACKGROUND OF THE INVENTION

1. Field of the Invention

The invention relates to a data recording apparatus using a detachable recording device and to a method of such an apparatus.

2. Related Background Art

Hitherto, in a data recording apparatus using a detachable recording device, after a free capacity of the device was once examined, a power source of the apparatus is continuously held. Therefore, each time the power source of the apparatus is turned off, the free capacity is examined.

The following two methods are known as a method of taking out the device.

The first method is a method whereby as shown in a data recording apparatus using a floppy disk (3.5 inches, 5.25 inches, etc.) or the like as a recording device, a mechanical mechanism system is used and the taking-out of the device is prevented by display means for indicating a state during the recording.

The second method is a method whereby as shown in a data recording apparatus using a magnetooptic disk or the like as a recording device, a loading system is used and the taking-out of the device is prevented by display means for indicating a state during the recording.

In both of the above first and second conventional methods, although the device can be taken out any time when the user wants to take out the device, in the case where the device is erroneously taken out during the recording, there is a possibility such that a fatal data breakage is caused in the device. In the worst case, there is a case where every data on the device cannot be read out.

SUMMARY OF THE INVENTION

According to an embodiment of the invention, there is provided a data recording apparatus in which a recording device is detachable, comprising: discriminating means for discriminating whether the device attached to the data recording apparatus can be recorded or not; and executing means constructed in a manner such that when it is determined by the discriminating means that the recording can be performed, the recording of image data is executed to only the device, and in the case where it is determined by the discriminating means that the recording cannot be performed, a message informing that the recording cannot be performed is outputted and the recording of the image data is executed to the built-in recording medium.

BRIEF DESCRIPTION OF THE DRAWINGS

FIGS. 4A and 4B are flowcharts at the time of the photographing operation in the embodiment;

DETAILED DESCRIPTION OF THE PREFERRED EMBODIMENT

Figure 1:
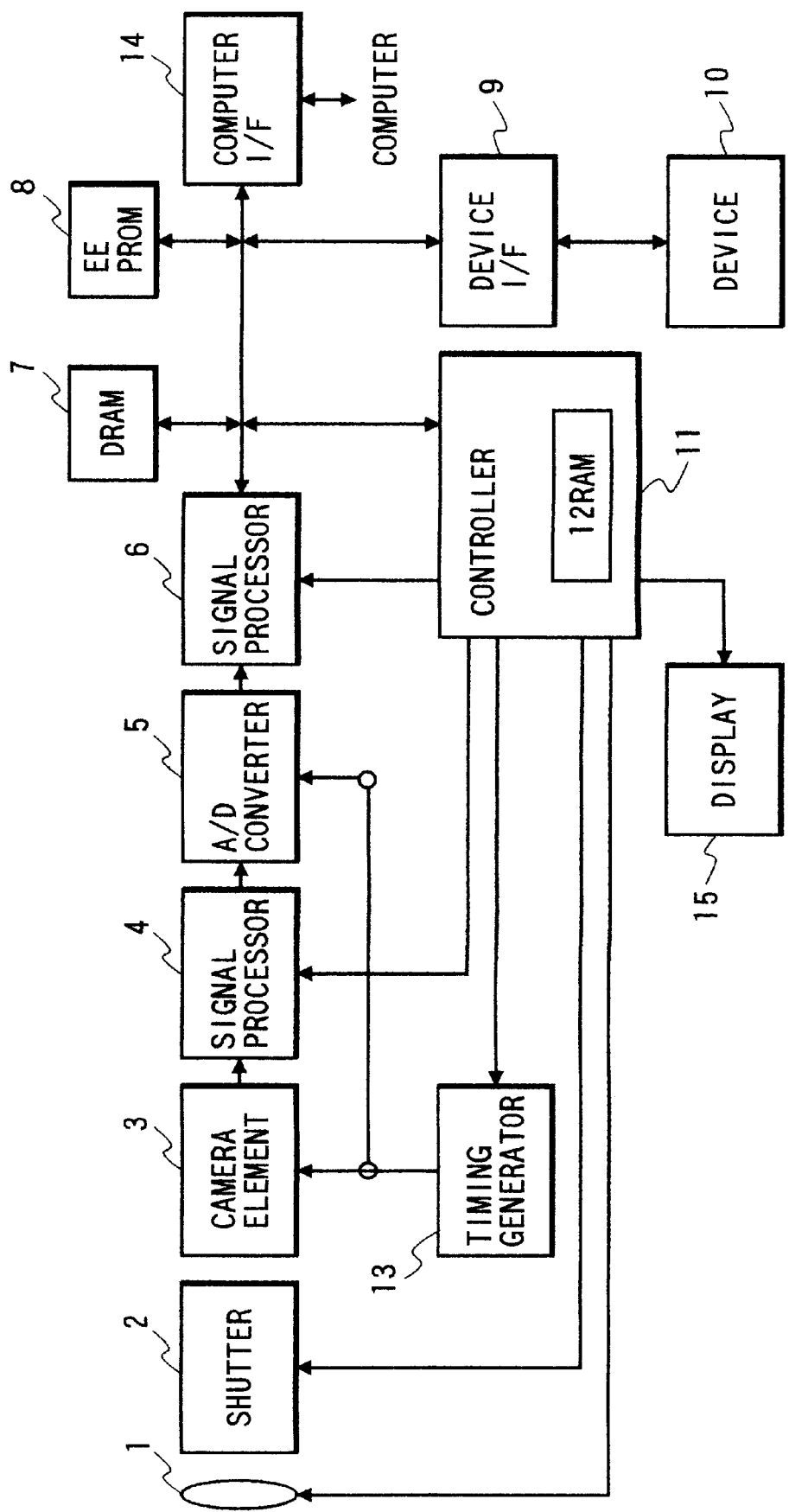
FIG. 1 is a constructional block diagram of an embodiment of the invention.

FIG. 1 shows an embodiment of the invention.

In the embodiment, as an example of a data recording apparatus, the operation in an electronic camera for converting an object image into an electric signal and recording as image data onto a recording device will be described.

In FIG. 1, reference numeral 1 denotes a lens; 2 a shutter; 3 a camera element; 4 a first signal processor for performing various corrections, a clamping, and the like to an image signal which is generated from the camera element 3; 5 an A/D converter for performing an analog/digital conversion of the image signal that is outputted from the signal processor 4; 6 a second signal processor for performing processes such as a compression and the like to digital image data that is outputted from the A/D converter 5; 7 a DRAM for temporarily storing the image data of at least one image; 8 an electrically erasable and writable EEPROM such as an FLASH memory or the like for storing the image data of at least one image; and 10 a card-shaped device called a PC card according to the well-known PCMCIA standard. The device 10 has a connector of 68 pins for connection.

The present apparatus mainly uses a detachable card-shaped device such as hard disk, FLASH memory, SRAM, DRAM, or the like for recording or reading the image data. However, since the connector has a common standardized shape, another PC card (card such as modem, SCSI, LAN, sound, or the like) can be also connected.

Reference numeral 9 denotes a device interface (I/F) for transmitting and receiving data to/from the device 10; 13 a timing generator for generating various timing signals to the camera element 3 and A/D converter 5; 14 a computer interface (I/F) for transmitting the image data to an external computer or the like (not shown); 11 a whole control unit for controlling the whole apparatus; 12 an RAM for storing various data in the whole control unit 11; and 15 a display for displaying a state of the apparatus.

The whole control unit 11, second signal processor 6, DRAM 7, EEPROM 8, device I/F 9, and computer I/F 14 are connected by a bus, respectively.

Figure 2:
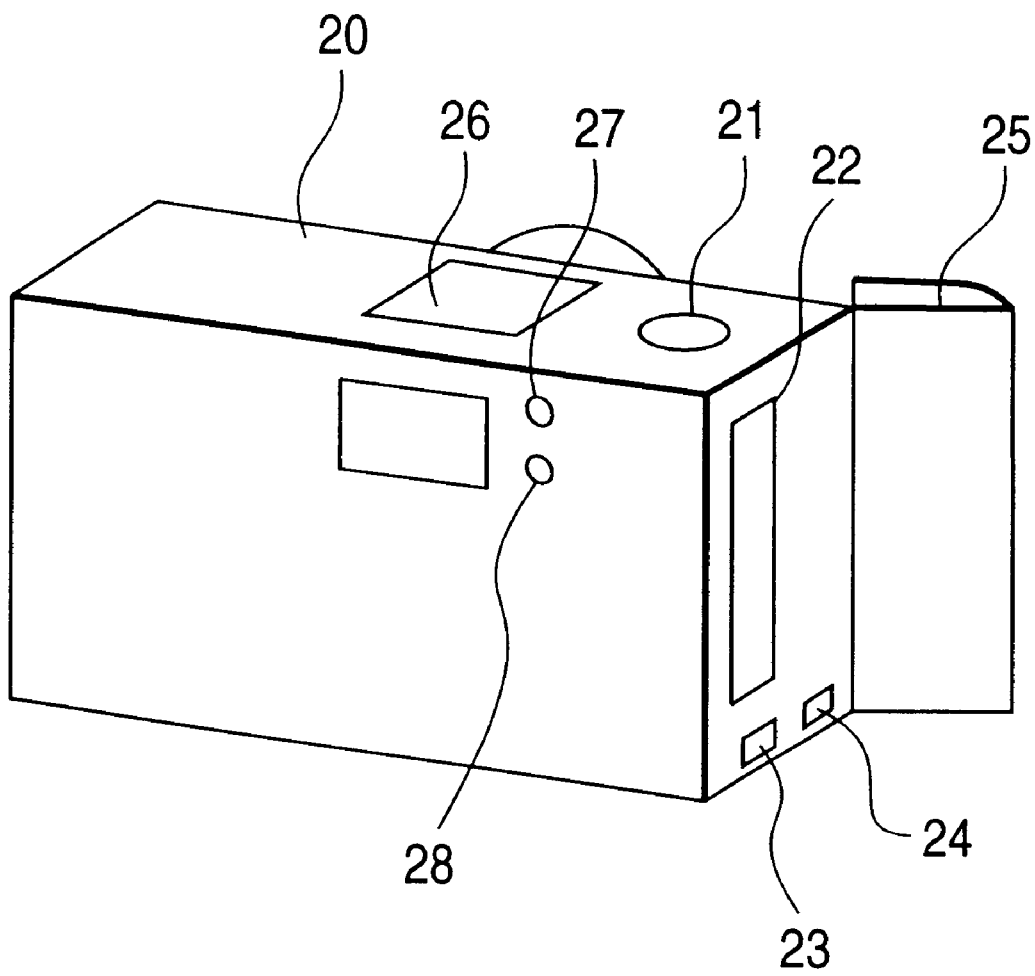
FIG. 2 is a rear view of an electronic camera main body of the embodiment.

FIG. 2 shows a rear view of the electronic camera main body of the embodiment.

In FIG. 2, reference numeral 20 denotes an electronic camera main body; 21 a release switch; 22 an opening portion for inserting the device 10; 23 an ejection switch to take out the device 10; 24 a detection switch; and 25 a cover for covering the opening portion 22, ejection switch 23, and detection switch 24. The detection switch 24 is turned on/off in association with the opening/closure of the cover 25. The turn-on/off of the detection switch 24 can be detected by the whole control unit 11. Reference numerals 26, 27, and 28 denote an LCD display, a green lamp, and a red lamp for displaying a state of the apparatus.

In the above construction, a recording system in the case where the EEPROM 8 and device 10 are recording devices will now be described with reference to FIG. 6.

Figure 6:
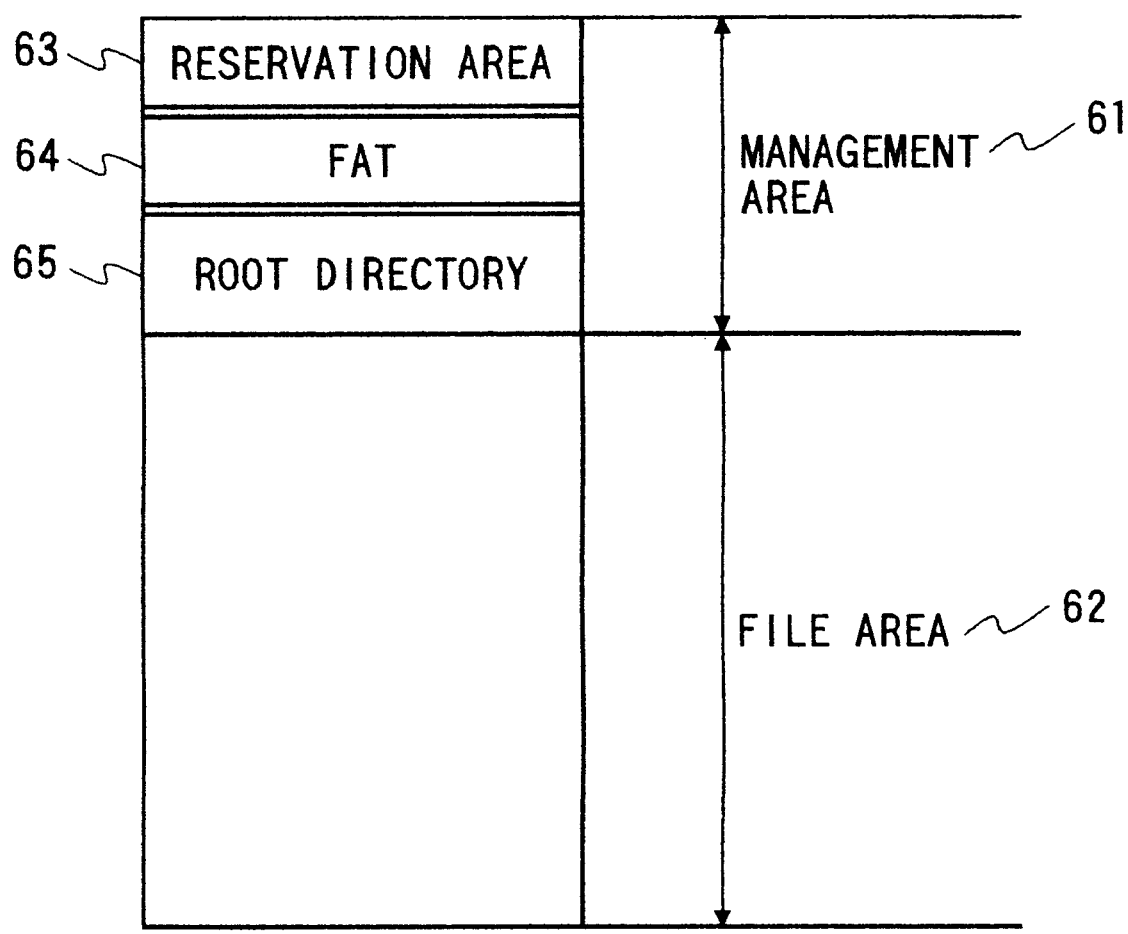
FIG. 6 is a data area diagram of a recording medium in the embodiment.

The EEPROM 8 and device 10 are divided into a management area 61 and a file area 62 as shown in FIG. 6.

Such a set of management area 61 and file area 62 are called a drive and one or a plurality of drives can be formed with respect to one recording medium. One drive has a peculiar identification number and a peculiar identification name (hereinafter, referred to as a volume serial number and a volume label, respectively).

The management area 61 has a reservation area 63, a file allocation table (hereinafter, abbreviated to "FAT") 64, and a root directory 65 for managing files. Actual data of the file is recorded in the file area. An access unit of the file area is called a cluster. The file is made up of one or a plurality of clusters in accordance with a data size. The FAT has an entry corresponding to each cluster and a value of the entry corresponding to the cluster to be continued has been recorded in the entry. When there is no entry to be continued (entry corresponding to the last cluster of the file), a value indicative of such a fact has been recorded. A file name, a file size, a value of the head entry of the file, a date, and the like have been recorded in the directory.

In many cases, the FAT has been overlappingly recorded at a plurality of locations. Such an overlap recording is performed for the purpose of assuring the reliability because if the data of the FAT cannot be read, the information recorded on the recording medium cannot be read out. In the other cases, some means for assuring the reliability is often fundamentally taken for the FAT. Since the recording system in this instance is well known, its further detailed description is omitted here.

Figure 3B:
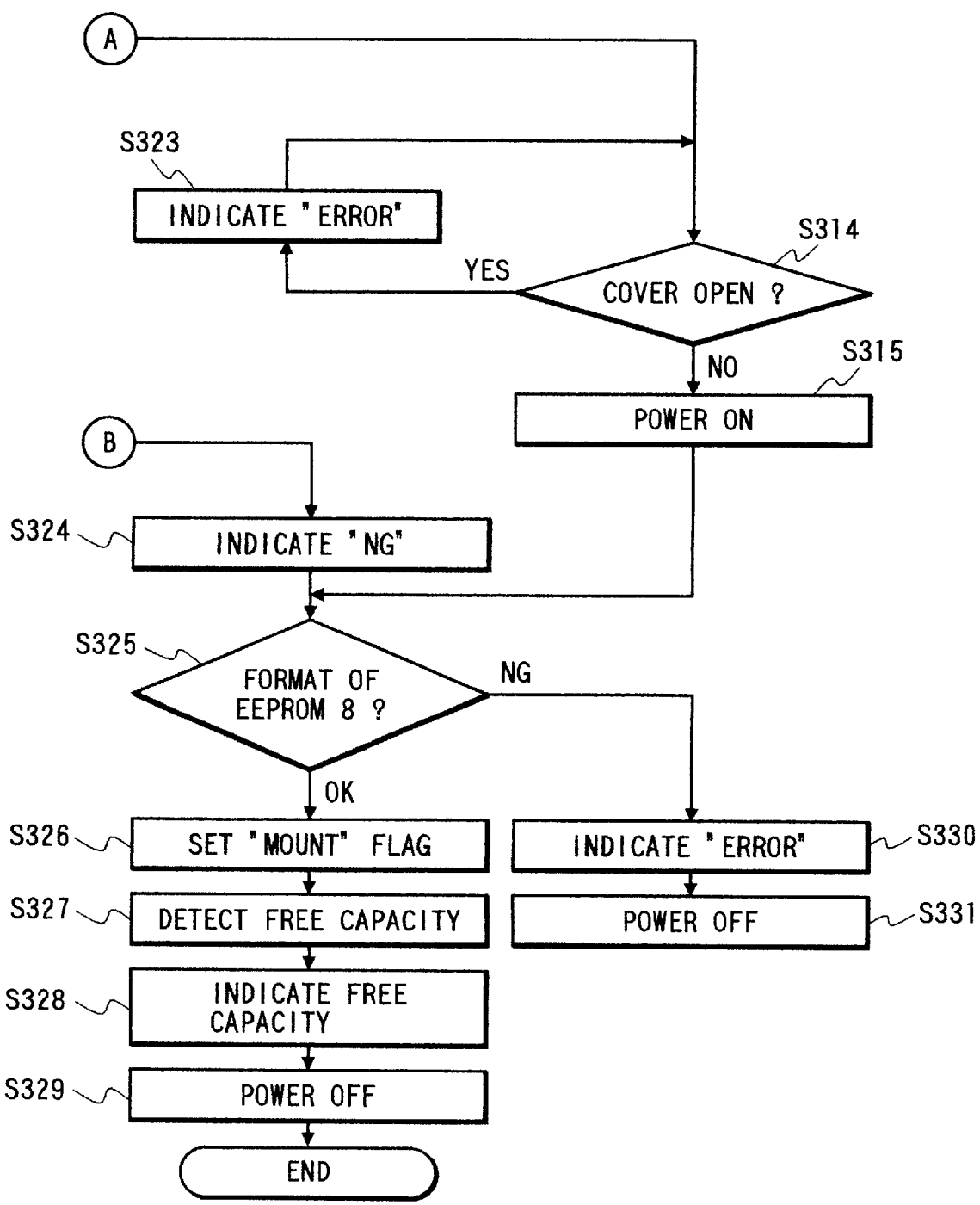
FIG. 3 is comprised of FIGS. 3A and 3B illustrating flowcharts at the time of the initial operation in the embodiment.

The initial operation of the electronic camera according to the embodiment will now be described with reference to a flowchart of FIGS. 3A and 3B.

In step S300, a check is made to see if the device 10 has been loaded to the electronic camera main body. If YES, a check is made in step S301 to see if the cover is open. When the cover is closed, a power source is supplied to the electronic camera main body excluding the device 10 in step S302. When it is decided in step S301 that the cover is open, an error message is displayed in step S313, thereby informing the user of a fact that the cover is open and also enabling a message for promoting the user to close the cover to be generated.

The electronic camera main body has two CPUs of a main CPU and a sub CPU. The sub CPU is always operating and performs detections (a detection about the opening/closure of the cover and a detection about the loading of a card) until the power source is turned on. On the basis of a result of the discrimination of the sub CPU, the power source to the main CPU is turned on or off.

In step S300, when it is determined that the device 10 is not attached to the electronic camera main body, a check is made in step S314 to see if the cover is open. When the cover is closed, the power source is supplied to the electronic camera main body excluding the device 10 in step S315. When it is decided in step S314 that the cover is open, the error message is displayed in step S323, thereby informing the user of a face that the cover is open and also enabling a message to promote the user to close the cover to be generated. After the power source was turned on (S315), the processing routine advances to steps S325 to S331, which will be explained hereinlater.

The whole control unit 11 detects two predetermined states in the 68 pins through the device I/F 9. In accordance with the states, a voltage of 3.3V or 5V is supplied to the device 10 (a deciding method in this instance is well known), thereby reading out the data in an ROM (not shown) for device information in the device 10.

Information regarding the device has been recorded in the data. For example, there are items such as speed of device, kind, size, interface, power source, access space, IRQ, and the like. Since a format of this information is well known in the PCMCIA standard, its further detailed description is omitted here.

In step S303, a check is made to see if the device is available in the electronic camera on the basis of the information.

A discrimination reference in this instance depends on hardware/software of the electronic camera. In the hardware side, whether the electronic camera has an environment that is necessary for making the device operative or not is discriminated on the basis of items such as speed of the device, size, interface, power source, access space, interrupt request line (IRQ), and the like. In the software side, whether program software that is necessary to make the device operative exists in the electronic camera or not is discriminated on the basis of the items such as a kind and the like of the device.

When it is determined that the device is available by the discrimination results from both of the hardware and software viewpoints, the green lamp 27 of the display 15 is flickered twice in step S304.

When it is decided that the device is not available, the red lamp 28 of the display 15 is flickered for two seconds at a high speed in step S324. Flickering methods or the like in the case where the device is available and the case where it is not available are not limited to the methods mentioned above.

When the device 10 is available and can operate at both of the power voltages of 3.3V and 5V, a power voltage higher than the voltage that can be supplied from the electronic camera, namely, 5V is supplied to the device 10 prior to operating the device 10.

Although the high power voltage is supplied in step S305, in the case where the user wants to suppress an electric power consumption or the like, the lowest power voltage (for example, 3.3V) can be also supplied.

Although the highest or lowest power voltage is always supplied in the above example, when the user can efficiently use the device or the like, it is also possible to construct in a manner such that the power supply is controlled so as to switch the voltage from the high voltage (for example, 5V) to the low voltage (for instance, 3.3V) in the middle of the operation (such a construction is not shown).

The power voltage can be either manually or automatically switched. Particularly, in case of automatically switching, the operation to switch the power voltage when it is below a predetermined threshold value can be also performed.

Free capacity data in the EEPROM 8 is copied into the DRAM 7 (or RAM 12) and a flag indicating that the free capacity data in the DRAM 7 is valid is set.

The flag is reset in association with a change of the cover 25 or a cover which covers a battery (not shown) serving as a power source of the apparatus.

After that, format information is read out from the device.

That is, in step S306, the information in the management area 61 in FIG. 6 is read out, the data necessary for device control is stored into the DRAM 7 (or RAM 12), and the reliability of the data (whether there is a format abnormality or not) is verified (this verifying method is not specified).

If a format abnormality or an abnormality (read error or the like) due to a failure of the device or the like is detected, an error regarding the device is indicated to the LCD display 26 of the display 15 in step S311. The power source of the device and the electronic camera main body are turned off in step S310. The photographing operation as a camera is inhibited until the device is taken out of the electronic camera. Further, for more safety, the photographing operation can be also inhibited until the device is taken out of the electronic camera and the cover is closed.

When there is no problem in the data, a flag indicating that the data is valid ("mount" flag of the device) is set in step S307.

In step S308, a free capacity of the device is subsequently retrieved.

When the flag indicating that the free capacity data in the DRAM 7 is valid is reset, the management area 61 of the device is retrieved and the free capacity is calculated. The free capacity can be known by a method whereby each entry in a file allocation table (FAT) area 64 is retrieved and whether each entry is not used or not is detected and the free capacity of each entry is added. The free capacity data is stored into the DRAM 7 (or RAM 12). Further, a flag indicating that the free capacity data in the DRAM 7 (free capacity retrieved flag) is valid is set. A message indicating that the device inserted into the electronic camera main body is valid is displayed on the display and the free capacity is displayed on the LCD display 26 of the display 15. (Step S309)

After that, the free capacity data in the DRAM 7 is copied into the EEPROM 8. Subsequently, the power sources of the device and the electronic camera main body are turned off in step S310.

When it is determined in step S303 that the device 10 is not available, the format information is first read out from the EEPROM 8. That is, the information in the management area 61 in FIG. 6 is read out, the data necessary for device control is stored into the DRAM 7 (or RAM 12), and the reliability of the data (whether there is a format abnormality or not) is verified. The verifying method is not specified. (Step S325)

If the format abnormality or an abnormality (read error or the like) due to a failure of the EEPROM 8 or the like is detected, an error regarding the recording medium is displayed on the display and the power source of the electronic camera main body is turned off. The photographing operation as a camera is inhibited until the EEPROM 8 is formatted in the electronic camera. (Steps S330, S331)

When there is no problem in the data, a flag indicating that the data is valid ("mount" flag) is set in step S326.

In step S327, the free capacity of the EEPROM 8 is retrieved.

The free capacity can be known by a method whereby each entry in the FAT area 64 is retrieved and whether each entry is not used or not is detected and the free capacity of each entry is added. The free capacity data is stored into the DRAM 7 (or RAM 12).

Further, a flag indicating that the free capacity data in the DRAM 7 (free capacity retrieved flag) is valid is set. A message indicating that the recording medium in the electronic camera is valid is displayed on the display and the free capacity is displayed on the LCD display 26 of the display 15. (Step S328)

After that, the free capacity data in the DRAM 7 is copied into the EEPROM 8. Subsequently, the power sources of the device and the electronic camera main body are turned off in step S329.

Even when the device 10 is preliminarily inserted in the electronic camera main body and the battery is inserted later, the operation is executed in a manner similar to the above.

When a fact that there is no free capacity in the device is detected in spite of a fact that it is determined that the device is a recordable device, in a manner similar to the case where the format abnormality or the device failure is detected, a message indicating that the device has no free capacity is displayed on the LCD display 26 of the display 15, and the power sources of the device and the electronic camera main body are turned off.

It is also possible to use a construction such that when a fact that there is no free capacity in the device is detected, whether the data is recorded into the built-in recording medium manually or automatically or not can be selected.

The operation upon photographing will now be described with reference to a flowchart of FIG. 4A.

When an image pickup recording command is inputted to the whole control unit 11 by a switch or the like (not shown) (or when an image pickup recording command is inputted from an external computer or the like (not shown) through the computer I/F 14), the power source of the electronic camera main body is turned on in step S400.

The free capacity data in the EEPROM 8 is copied into the DRAM 7 (or RAM 12). A flag indicating that the free capacity data in the DRAM 7 is valid is set. The whole control unit 11 executes the image pickup recording operation.

That is, the shutter 2 is driven and an exposure is performed in step S401. The reading operation of the camera element 3 is executed in step S402.

In step S403, the image signal is subjected to a color correction and various processes by the first signal processor 4. After that, in step S404, the analog/digital conversion is performed by the A/D converter 5 and the digital signal is once stored into the DRAM 7 as a buffer memory through the second signal processor 6.

In step S405, the image data stored in the DRAM 7 is subjected to a compressing process in the second signal processor 6 and, after that, it is again stored into the DRAM 7. It is also possible to construct in a manner such that the image data which was analog/digital converted by the A/D converter 5 is subjected to the compressing process by the second signal processor 6 in a real-time manner and is subsequently stored into the DRAM 7. Or, it is not always necessary to perform the compressing process.

Subsequently, in step S406, when the image data is recorded to the device 10, a directory is first formed through the device I/F 9. In step S407, the image data which was once stored in the DRAM 7 is recorded into the device 10 every block of a predetermined size and, further, the file size and date in the directory are also updated.

Upon recording, when the clusters in the recording are insufficient, the value of the FAT of the device 10 is discriminated any time, the entry which is not used is added to the cluster chain, the recording is continued, and at the same time, the free capacity data in the DRAM 7 (or RAM 12) is also updated.

That is, the free capacity data is reduced by only an amount corresponding to the consumed entry amount of the FAT in association with the recording to the device 10.

The foregoing block denotes a unit divided for various processes such as unit in which the image data is divided and compressed per time, image data of one line, unit of the memory, or the like and its details are not limited here.

In step S408, a check is made to see if all of the image data has been recorded. When it is determined that the recording of all image data is finished, in step S409, the free capacity data in the DRAM 7 is copied into the EEPROM 8. After that, the power sources of the device and the electronic camera main body are turned off.

The operation when the photographing operation is executed and the cover 25 is opened while the image data is being recorded to the device 10 (steps S406, S407) will now be described in accordance with a flowchart of FIG. 4B.

When the opening of the cover 25 is detected by the detection switch 24, the whole control unit 11 stops the subsequent execution of a new file access to the device 10 in step S410.

In step S411, the recording on a block unit during the execution at that time or the other file access which is being executed is completed. In step S412, a flag indicating that the format information that was read out from the device 10 and is necessary to the device control and has been stored in the DRAM 7 (or RAM 12) is valid (device "mount" flag) is reset.

After that, in step S413, the file access to the device 10 which has been stopped in step S410 is continued and, further, the device operates so as to also accept the execution of a new file access. However, since the format information has already been invalidated (unmount), the device operates so as to return errors as for all of the file accesses.

After the elapse of a predetermined time, in step S414, the power sources of the device and the electronic camera main body are turned off.

The operation when the cover 25 is opened during the recording of the image data to the device 10 has been described here. However, the above operation can be also executed when a fact that the power voltage is equal to or less than a predetermined value is detected when the electronic camera is operating by a battery (not shown).

Even if a structure without the cover 25 is used, a fact that the ejection switch 23 to take out the device 10 was depressed or the like is detected and the whole control unit 11 can stop the execution of a new file access to the device 10 in response to such a detection.

The ejection switch 23 can be electronically or mechanically constructed. It is sufficient to construct in a manner such that when the ejection switch 23 is depressed, the file access which is being executed is completed for a period of time of a certain timing and after the format information was invalidated, the operation to turn off the power sources of the electronic camera main body and the like is executed.

Figure 5:
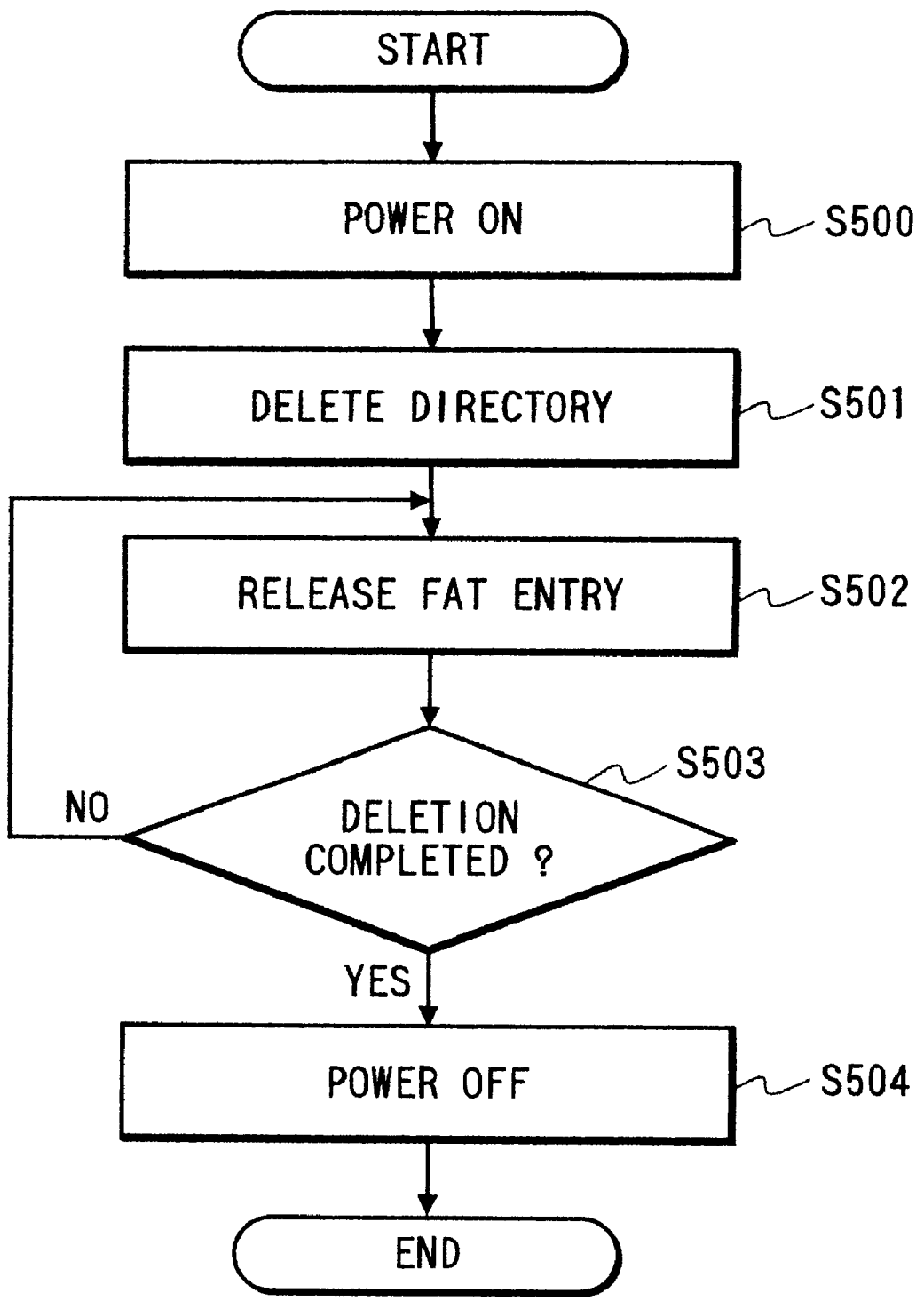
FIG. 5 is a flowchart at the time of the deleting operation in the embodiment.

The operation upon deletion will now be described with reference to a flowchart of FIG. 5.

When a deleting command is inputted to the whole control unit 11 by a switch or the like (not shown) (or, when the deleting command is inputted from an external computer or the like (not shown) through the computer I/F 14), the power source of the electronic camera main body is turned on in step S500.

The free capacity data in the EEPROM 8 is copied into the DRAM 7 (or RAM 12). The flag indicating that the free capacity data in the DRAM 7 is valid is set.

In step S501, the whole control unit 11 executes the deleting operation.

That is, the directory is first deleted for a predetermined data file of the device 10 through the device I/F 9.

In step S502, from the value of the head entry of the file in the directory, in accordance with the cluster chain in the FAT area 64, all of the entries of the file are set into an unused state and, at the same time, the free capacity data in the DRAM 7 (or RAM 12) is also updated. That is, in association with the deletion to the device 10, the free capacity data is increased by only an amount corresponding to the released entries of the FAT.

In step S503, the predetermined data file is deleted and the free capacity data in the DRAM 7 is copied into the EEPROM 8 and, after that, the power sources of the device and the electronic camera main body are turned off (step S504).

According to the invention as described above, in the data recording apparatus using a detachable recording device, whether the device is recordable or not can be clearly known. Even if the device is not recordable, the data can be recorded into the recording medium built in the apparatus. Further, the format abnormality of the recording medium or the medium abnormality can be also clearly known.

Since it is sufficient to merely examine the free capacity of the recording medium once and even if the power source of the apparatus is again turned on, there is no need to examine it again, so that an electric power and a time for detecting the free capacity can be remarkably reduced.

When the information for device control is read out from the device and the device is controlled on the basis of the read-out information. When the opening of the cover which covers the device is detected or when a state in which the power voltage is equal to or less than a predetermined value during the operation with the battery is detected, the information for the device control which was read out is invalidated. Consequently, the processes at the time of error can be simplified and the amount of programs can be reduced.

What is claimed is:

1. A data recording apparatus comprising:

an opening unit to which an external data storage device is detachably connected;

cover means for covering the opening unit, said cover means being uncovered so that the data storage device can be detached from the opening unit;

recording means for recording data in the data storage device;

control means for controlling the data storage device using control information read out from the data storage device;

detection means for detecting an opening operation of said cover means during a recording operation performed by said recording means;

access stop means for stopping access to the data storage device when an opening operation of said cover means is detected; and invalidation means for invalidating the control information read out from the data storage device in the case that an opening operation of said cover means is detected, thereby making the recording to the data storage device performed by said recording means ineffective after the opening operation is detected.

2. A data recording apparatus according to claim 1, wherein the control information for the data storage device is format information for a memory.

3. A data recording apparatus according to claim 1, wherein the control information is invalidated by resetting a flag set in accordance with the control information.

4. A data recording apparatus according to claim 1, wherein the control information is invalidated after completing recording of an unfinished data block.

5. A data recording method for a recording apparatus which comprises an opening unit, to which an external data storage device is detachably connected, and a cover for covering the opening unit, the cover being uncovered so that the data storage device can be detached from the opening unit, said method comprising the steps of:

reading out control information for the data storage device from the data storage device;

recording data in the data storage device by controlling the recording apparatus using the control information read out from the data storage device;

detecting an opening operation of the cover during a recording operation performed in said recording step;

stopping access to the data storage device when an opening operation of the cover is detected; and invalidating the control information read out from the data storage device in the case that an opening operation of the cover is detected, thereby making recording to the data storage device performed in said recording step ineffective after the opening operation is detected.

6. A data recording method according to claim 5, wherein the control information for the data storage device is format information for a memory.

7. A data recording method according to claim 6, wherein the control information is invalidated by resetting a flag set in accordance with the control information.

8. A data recording method according to claim 6, wherein the control information is invalidated after completing recording of an unfinished data block.

* * * * *

UNITED STATES PATENT AND TRADEMARK OFFICE
CERTIFICATE OF CORRECTION

PATENT NO.  : 6,631,427 B2
DATED       : October 7, 2003
INVENTOR(S) : Ryoji Kubo It is certified that error appears in the above-identified patent and that said Letters Patent is hereby corrected as shown below:

<u>Column 2,</u>
Line 21, "an" second occurrence should read -- a --.
Line 24, "PCMCTA" should read -- Personal Computer Memory Card International Association (PCMCIA) --.
Line 39, "an" should read -- a --.

<u>Column 3,</u>
Line 60, "an" should read -- a --.

<u>Column 5,</u>
Line 11, "not" (1st occurrence) should be deleted.
Line 46, "not" (1st occurrence) should be deleted.

<u>Column 10,</u>
Line 4, "claim 6," should read -- claim 5, --.
Line 7, "claim 6," should read -- claim 5, --.

Signed and Sealed this

Twenty-second Day of June, 2004

JON W. DUDAS
*Acting Director of the United States Patent and Trademark Office*